United States Patent [19]

Caramanian

[11] 4,116,915

[45] Sep. 26, 1978

[54] COMPOSITION FOR TREATING CONCRETE SURFACES

[76] Inventor: John A. Caramanian, 1021 Summer St., Cincinnati, Ohio 45204

[21] Appl. No.: 782,568

[22] Filed: Mar. 29, 1977

[51] Int. Cl.² ................................................. C08K 5/10
[52] U.S. Cl. ............................. 260/31.4 EP; 427/386
[58] Field of Search ................................. 260/31.4 EP

[56] References Cited

U.S. PATENT DOCUMENTS 3,900,622  8/1975  Caramanian ................. 260/31.4 EP Primary Examiner—Herbert J. Lilling
Attorney, Agent, or Firm—Edmund M. Jaskiewicz

[57] ABSTRACT

A concrete surface is treated with a low viscosity solution comprising an epoxy resin and an organic elastomeric polysulfide resin which penetrates deeply into the surface and fills voids therein.

7 Claims, No Drawings

COMPOSITION FOR TREATING CONCRETE SURFACES

The present invention relates to a method of treating concrete surfaces and more particularly to an improved sealing composition to render such surfaces wear and erosion resistant. The present invention constitutes an improvement over that described in U.S. Pat. No. 3,900,622 to John A. Caramanian. Utilizing the new and improved sealing composition in accordance with the present invention all existing air pollution control laws are fully satisfied. The method is useful, furthermore, for application to prevent erosion of new concrete and to stop erosion of old concrete surfaces.

The main object of the present invention is to provide an improved method of protecting concrete surfaces utilizing a sealing composition which penetrates deeply i.e. ¼ inch to ⅜ inches, into concrete to prevent erosion thereof due to freeze-thaw cycles.

A further object of this invention is to provide an elastomeric low viscosity sealing composition which greatly reduces the deleterious effect of water, oil or grease on concrete surfaces, and renders the resultant treated concrete resistant to the attack of salt, oil, gasoline, calcium chloride, urea and jet fuels.

A still further object of this invention is to provide an epoxy resin sealing composition for treating concrete to render the same tough and wear resistant yet flexible enough to expand and contract with the concrete.

The invention is useful for the treatment of such concrete areas as runways, bridge decks, parking garages, sidewalks, curbing abutments, walkways, airport parking areas and highways.

The sealing composition may comprise two liquid components, (A) an epoxy resin base component and (B) a polysulfide modified curing and hardening agent. Both components comprise relatively low viscosity solutions, as hereinafter described, and when mixed during use provide a solution which penetrates deeply into the concrete and fills the voids and cavities therein. If desired, a single can or component sealing composition may be utilized, eliminating the need of mixing e.g. (A) and (B) components as described. In such a single component system a heat cure hardener is used instead of one which cures the epoxy resin at room temperature. A heat gun can be used to cure the composition in situ during use.

Where the concrete treating composition comprises two components such as (A) and (B) as aforementioned, the hardener can be one which cures the epoxy resin at room temperature.

An example of this type of sealing composition for concrete surface treatment is as follows; the parts and percentages given are by weight unless otherwise stated:

Component A 34.00 parts glycidel-ether modified 100% solids epoxy resin (Shell Epon 815)
23.83 parts ethylene glycol monoethyl ether acetate
18.75 parts ethylene glycol monobutyl ether
9.50 parts toluol
7.98 parts mineral spirits (aliphatic petroleum hydrocarbon solvent) boiling range 150°–182° C
5.94 parts cyclohexane (aliphatic hydrocarbon solvent)
100.00 parts

Component B 13.63 parts polysulfide elastomer (Thiokol polysulfide LP-3)
8.00 parts diethylene triamine (curing or hardening agent)
28.29 parts ethylene glycol monoethyl ether acetate
22.26 parts ethylene glycol monobutyl ether
11.28 parts toluol
9.48 parts mineral spirits (aliphatic petroleum hydrocarbon solvent) boiling range 150°–182° C.
7.06 parts cyclohexane (aliphatic hydrocarbon solvent)
100.00 parts The epoxy resin of Component A can be the commercial product known as Shell Epon 815, a tradename of Shell Oil Company. This resin has a viscosity of about 5 to 7 poises at 25° C and is approximately 100% solids. The mineral spirits solvent component can be the commercial aliphatic petroleum hydrocarbon solvent known as Kwik Dri, a tradename of Ashland Oil & Refining Company (Commercial Solvent Div.). This aliphatic petroleum hydrocarbon solvent consists chiefly of paraffins e.g. n-Nonane ($C_9H_{20}$) and n-Decane ($C_{10}H_{22}$) and naphthenes (cycloparaffins) the solvent having a boiling point range of 150°–182° C. A typical example comprises, by volume %, paraffins 55%, naphthenes 37.7%, aromatics 7.0% and olefins 0.3%. The polysulfide elastomer can be the commercial product known as Thiokol polysulfide LP-3, a tradename of Thiokol Chemical Corporation.

Components A and B can be prepared and stored until ready for use. When ready for use, equal parts by weight or volumes of Components A and B are mixed together to form a mixed treating composition having a viscosity of approximately 12 seconds as measured in a Number 4 Ford Cup. For high density air entrained concrete, such as the type used in runways and bridge construction, the viscosity of the mixed sealant composition preferably is between 10 and 12 seconds. For other concrete surfaces the viscosity may range from 9 to 24 seconds depending upon the variations of the characteristics of the concrete. The mixed treating sealant composition consists of the following:

MIXED TREATING SEALANT COMPOSITION 34.00 parts glycidel-ether modified 100% solids epoxy resin (Shell Epon 815)
13.63 parts polysulfide elastomer (Thiokol polysulfide LP3)
8.00 parts diethylene triamine
52.12 parts ethylene glycol monoethyl ether acetate
41.01 parts ethylene glycol monobutyl ether
20.78 parts toluol
17.46 parts mineral spirits (Kwik Dri aliphatic hydrocarbon solvent)
13.00 parts cyclohexane
200.00 parts During use the mixed treating solution is spread on the concrete surface with a brush or roller or may be sprayed on the concrete, preferably at a rate of approximately 1 gallon to 100–150 sq. ft. of concrete surface. The solution penetrates a substantial depth into the concrete, the depth of penetration varying somewhat with the consistency of the concrete, e.g. penetration being about one-fourth to three-eighths inches in highway concrete. The improvement of the present treatment over the composition described in U.S. Pat. No. 3,900,622 is achieved by increasing the content of epoxy resin, i.e. approximately 8-10% above that previously used, and using principally aliphatic hydrocarbon solvents in place of aromatic solvents such as heretofore employed. Note, for instance, the aforesaid patent concrete treating composition. In accordance with the present improved treating solution, the epoxy resin solids content is increased from about 18% as heretofore to approximately 28%. This increased resin solids content results in an unexpected improvement in the treating solution which apparently is brought about because more of the epoxy resin is imparted during use and made to penetrate into the concrete surface thereby providing greater protection of the thus treated concrete than achieved heretofore.

As will be noted, furthermore, the concrete treating composition of this invention differs from that of said previous patent in that the new composition contains approximately 30 parts of aliphatic petroleum hydrocarbon solvents or diluents having relatively high boiling points e.g. 150°-182° C. Also methyl isobutyl ketone which has a relatively low boiling point (115° C) is entirely eliminated. Likewise, the aromatic hydrocarbon solvent, e.g. Hisol 10F, has been replaced by the aliphatic petroleum hydrocarbon solvents. By reason of these changes, the resultant treating solution penetrates more readily into the concrete thus providing better resistance to erosion and wear to the treated concrete than prior treatments. A significant improvement, as shown by tests conducted with the new composition as hereinabove set out most existing air pollution control laws are fully satisfied e.g. the air pollution Rule 66 as adopted for Los Angeles County in California, and similar air pollution regulations and rules throughout the United States.

The resinous mixture composition in use sets sufficiently in about an hour when the temperature of the concrete being treated is about 72° F, and sets hard in about 48 hours at that temperature. The resinous mixture penetrates readily into the concrete filling the voids of the concrete and protects the concrete against entry of water and the like foreign matter. The elastomer allows the resin to expand or stretch within the voids and cavities of the concrete filling the same without separating or peeling from the wall cavities.

In the examples given, a glycidel-ether modified epoxy resin is set out, but other epoxy resins may be used, for example, the epoxy resins as manufactured by Celanese Company and sold under the tradename EPI-Rez. In addition, as will be appreciated, other epoxy resins substitutions may be made e.g. using the Reichhold Co. line of resins marketed under the tradename EPOTUF. Other resins having an epoxide equivalent of a minimum of 175 to a maximum of 225 may be substituted for the epoxy resin described in practicing this invention. Likewise, other polysulfide elastomers may be used, such as are compatible with the resin and solvents and are not water soluble. Other curing compounds or agents may be substituted for diethylene triamine e.g. triethylene tetramine. Also the EPI Cure series products produced and tradenamed by Celanese Company of Louisville, Kentucky. Further curing compounds as made by Reichhold Chemicals under the tradename EPOTUF series 37-629 may be substituted in varying amounts for diethylene triamine.

Where a single can or component system is desired, as heretofore mentioned, the mixed treating sealant composition may be stored at low temperature e.g. below 40° F, and preferably 0° F prior to use to preclude pre- curing or hardening of the sealant composition before use. Such a single component mixture preferably may contain a heat cure hardener i.e. heat curing at temperatures above room temperature. In such single can sealing compositions the sealant is applied to the concrete and heat cured in situ, as with the aid of a heat gun. For this purpose, for example, boron trifluoride may be used as a hardener and which effects a heat cure of the resinous composition when heated from 93° C to 117° C for 10 minutes. Higher temperatures may be applied using heater means to accelerate the curing operation. Using the trifluoride hardener, the proportionate amount of hardener to epoxy resin comprises 1-5 parts hardener to 100 parts of epoxy resin. Other heat cure hardeners may be used e.g. phthalic anhydride which requires a heat cure from 120° to 140° C depending upon the proportionate amount of hardener used.

A composition for treating concrete surfaces in accordance with this invention broadly consists essentially of 25 to 40 parts epoxy resin, 10 to 15 parts polysulfide elastomer which is compatible with the epoxy resin, 45 to 55 parts of ethylene glycol monoethyl acetate, 35 to 45 parts ethylene glycol monobutyl ether, and 50 to 60 parts diluent, the parts being by weight and the composition having a viscosity of 9 to 24 seconds measured with a Numer 4 Ford Cup.

A preferred treating solution which provides the improved results in accordance with this invention, when tested as described in U.S. Pat. No. 3,900,622, comprises approximately 34 parts of an epoxy resin, 8 parts if a curing agent or an amount sufficient to cause setting of the resin, 13.5 parts of an organic elastomer e.g. a polysulfide elastomer, 52 parts of ethylene glycol monoethyl acetate, 41 parts of ethylene glycol monobutyl ether and 51 parts of diluent, the diluent being toluol and aliphatic hydrocarbon solvents.

As described on the aforesaid U.S. Patent the results of tests conducted on sample slabs of concrete treated with the sealant of the present invention showed there was a substantial improvement in penetration and protection afforded as compared with the prior concrete surface treating solutions.

It will be understood that this invention is susceptible to modification in order to adapt it to different usages and conditions, and accordingly, it is desired to comprehend such modifications within this invention as may fall within the scope of the appended claims.

What is claimed is:

1. A composition for treating a concrete surface which consists essentially of 34 parts of an epoxy resin having an epoxide equivalent of a minimum of 175 to a maximum of 225, 13.6 parts of an organic polysulfide elastomer which is compatible with the epoxy resin, 8 parts of diethylene triamine, 52 parts ethylene glycol monoethyl ether acetate, 41 parts ethylene glycol monobutyl ether, and 51 parts of diluent in which a major portion is an aliphatic hydrocarbon solvent or diluents having a boiling point range from 150°-182° C., all parts being by weight, the composition having a viscosity of 9 to 24 seconds measured with a Number 4 Ford Cup.

2. A composition for treating a concrete surface which consists essentially of 25 to 40 parts of an epoxy resin having an epoxide equivalent of a minimum of 175 to a maximum of 225 10 to 15 parts of an organic polysulfide elastomer which is compatible with the epoxy resin, 45 to 55 parts of ethylene glycol monoethyl acetate, 35 to 45 parts of ethylene glycol monobutyl ether, and 50 to 60 parts of diluent in which a major portion is an aliphatic hydrocarbon solvent or diluents having a boiling point range from 150°–182° C., the parts being by weight and the composition having a viscosity of 9 to 24 seconds measured with a Number 4 Ford Cup.

3. A composition for treating a concrete surface as set out in claim 2 wherein the epoxy resin solids content is approximately 28% by weight of the composition.

4. A sealant composition for treating concrete surfaces as in claim 2 wherein a hardener is included for curing the epoxy resinous composition.

5. A sealant composition for treating concrete surfaces as in claim 4 wherein the hardener is heat cured at a temperature above room temperature.

6. A sealant composition for treating concrete as in claim 5 wherein the hardener is boron trifluoride.

7. A sealant composition for treating concrete surfaces as in claim 4 wherein the composition is a single component mixture.

* * * * *